United States Patent
Koike et al.

(10) Patent No.: US 7,314,276 B2
(45) Date of Patent: Jan. 1, 2008

(54) INK-JET RECORDING METHOD, INK-JET INK, INK-JET RECORDING UNIT, INK CARTRIDGE FOR INK-JET RECORDING AND INK-JET RECORDING APPARATUS

(75) Inventors: Shoji Koike, Kanagawa (JP); Yoshihisa Yamashita, Kanagawa (JP); Kohei Watanabe, Tokyo (JP); Hayato Ida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 407 days.

(21) Appl. No.: 11/008,918

(22) Filed: Dec. 13, 2004

(65) Prior Publication Data

US 2005/0128269 A1 Jun. 16, 2005

(30) Foreign Application Priority Data

Dec. 12, 2003 (JP) .............................. 2003-415800

(51) Int. Cl.
    *G01D 11/00* (2006.01)
(52) U.S. Cl. ........................................ 347/100; 347/101
(58) Field of Classification Search ................ 347/100, 347/95, 96, 101, 105; 106/31.6, 31.27, 31.13; 523/160; 428/195, 32.1
    See application file for complete search history.

(56) References Cited

U.S. PATENT DOCUMENTS

| | | | |
|---|---|---|---|
| 4,330,787 A | 5/1982 | Sato et al. | |
| 4,352,691 A | 10/1982 | Owatari et al. | |
| 4,459,600 A | 7/1984 | Sato et al. | |
| 4,723,129 A | 2/1988 | Endo et al. | |
| 4,740,796 A | 4/1988 | Endo et al. | |
| 4,849,774 A | 7/1989 | Endo et al. | |
| 5,085,698 A | 2/1992 | Ma et al. | |
| 5,122,814 A | 6/1992 | Endo et al. | |
| 5,159,349 A | 10/1992 | Endo et al. | |
| 5,221,334 A | 6/1993 | Ma et al. | |
| 5,272,201 A | 12/1993 | Ma et al. | |
| 5,519,085 A | 5/1996 | Ma et al. | |
| 5,521,621 A | 5/1996 | Endo et al. | |
| 5,754,194 A | 5/1998 | Endo et al. | |
| 5,852,075 A | 12/1998 | Held | |
| 5,854,331 A | 12/1998 | Ma et al. | |
| 6,080,229 A * | 6/2000 | Watanabe et al. | 106/31.43 |
| 6,117,921 A | 9/2000 | Ma et al. | |
| 6,471,321 B1 | 10/2002 | Aono et al. | |

(Continued)

FOREIGN PATENT DOCUMENTS

JP 61-59911 12/1986

(Continued)

*Primary Examiner*—Manish S. Shah
(74) *Attorney, Agent, or Firm*—Fitzpatrick, Cella, Harper & Scinto

(57) ABSTRACT

The present invention provides an ink-jet recording method for forming an image by applying an ink to a recording medium, wherein the ink used contains at least water, a pigment, a dispersing agent for dispersing the pigment and an acid form of an anionic surfactant. The ink has a surface tension higher than the critical surface tension of the recording medium. The ink is applied to the recording medium, and the surface tension of the ink is reduced to a surface tension below the critical surface tension of the recording medium after contacting the recording medium.

11 Claims, 5 Drawing Sheets

U.S. PATENT DOCUMENTS

| | | | |
|---|---|---|---|
| 2003/0107632 A1* | 6/2003 | Arita et al. ................ | 347/100 |
| 2004/0069183 A1* | 4/2004 | Kamoto et al. ............ | 347/100 |
| 2005/0128270 A1* | 6/2005 | Koike et al. ............... | 347/100 |
| 2005/0128271 A1 | 6/2005 | Koike et al. | |

FOREIGN PATENT DOCUMENTS

| | | |
|---|---|---|
| JP | 61-59912 | 12/1986 |
| JP | 61-59914 | 12/1986 |
| JP | 63-2996 | 1/1988 |
| JP | 5-179183 | 7/1993 |
| JP | 6-136311 | 5/1994 |
| JP | 7-53841 | 2/1995 |
| JP | 10-87768 | 4/1998 |
| JP | 11-43639 | 2/1999 |
| JP | 11-236502 | 8/1999 |
| JP | 11-269418 | 10/1999 |

* cited by examiner

INK-JET RECORDING METHOD, INK-JET INK, INK-JET RECORDING UNIT, INK CARTRIDGE FOR INK-JET RECORDING AND INK-JET RECORDING APPARATUS

BACKGROUND OF THE INVENTION

1. Field of the Invention

The present invention relates to ink-jet recording, particularly to an ink-jet recording method capable of obtaining a high quality image on a recording medium mainly comprising plain paper, and to an ink-jet ink (abbreviated as "ink" hereinafter) used thereto. The invention further relates to an ink-jet recording unit, ink cartridge for ink-jet recording and ink-jet recording apparatus.

2. Description of the Related Art

The ink-jet recording method is the method of ejecting small droplets of ink by applying energy, and recording by landing the droplet on a recording medium such as paper. Particularly, in the method using an electricity-heat conversion member as an ejection energy supply device for ejecting the droplets by allowing bubbles to be generated by applying a heat energy to the ink, a recording head is readily made to have high density nozzles to enable high resolution quality images to be recorded in a high speed (see Japanese Patent Publication Nos. 61-59911, 61-59912 and 61-59914).

However, since the conventional ink used for ink-jet recording usually comprises water as a principal component with supplemented water-soluble high boiling point solvents such as glycols for preventing drying and clogging the ink permeates deep into the recording paper when images are recorded on plain paper using such ink. Consequently, sufficient image densities cannot be obtained, and the quality of black letters are deteriorated and image densities become uneven probably due to uneven distribution of fillers and sizing agents on the surface of recording paper.

The above-mentioned problem can be solved by, for example, adjusting the pH of the ink above 12, or controlling the surface tension of the ink to be higher than the critical surface tension of the recording medium (Japanese Patent Publication No. 63-2996). Although the problems of the image density, clearness and the quality of black letters may be solved by recording with the ink described above, a problem of safety still remains while the ink is not suitable for high speed printing due to insufficient fixing speed.

SUMMARY OF THE INVENTION

The present invention was made in view of the above-mentioned problems. The present invention can provide an ink-jet recording method in which a performance having a high fixing speed on a recording medium mainly comprising plain paper and a performance capable of obtaining a high image density with an excellent clearness of the image are compatible with each other. The present invention can also provide an ink-jet ink, an ink-jet recording unit, an ink cartridge for ink-jet recording and an ink-jet printer used in the method.

A first aspect of the present invention is to provide an ink-jet recording method for forming an image by applying an ink to a recording medium, wherein the ink used comprises at least water, a pigment, a dispersing agent for dispersing the pigment and an acid form of an anionic surfactant, and has a surface tension higher than the critical surface tension of the recording medium. The ink applied to the recording medium, and the surface tension of the ink is reduced to a surface tension lower than or equal to the critical surface tension of the recording medium after contacting the recording medium.

According to the recording method of the present invention, the effect of the present invention becomes evident when the recording medium is plain paper; the critical micelle concentration of the anionic surfactant is lower than or equal to 0.0005 mol/L; and the reduce of the surface tension of the ink after contacting the recording medium is due to expression of surface activity of the anionic surfactant caused by a pH change of the ink.

A second aspect of the present invention is to provide an ink-jet ink comprising at least water, a pigment, a dispersing agent for dispersing the pigment and an acid form of an anionic surfactant, wherein the surface tension of the ink is higher than the critical surface tension of a recording medium as an object for applying the ink, and the surface tension of the ink reduces to a surface tension lower than or equal to the critical surface tension of the recording medium after contacting the recording medium.

According to the ink of the present invention, the effect of the invention becomes evident when the pH is lower than 6.5, the anionic surfactant has a cyclic peptide in the molecular structure, and the critical micelle concentration is lower than or equal to 0.0005 mol/L.

A third aspect of the present invention is to provide an ink-jet recording unit comprising an ink container for accommodating the ink-jet ink according to any one of the above aspects, and a head member for ejecting the ink.

A fourth aspect of the present invention is to provide an ink cartridge for ink-jet recording comprising a container for accommodating the ink according to any one of the above aspects.

A fifth aspect of the present invention is to provide an ink-jet recording apparatus comprising the ink-jet recording unit.

The ink-jet recording apparatus may comprise the ink cartridge for ink-jet recording.

A sixth aspect of the present invention is to provide an ink-jet recording method in which a liquid containing an alkaline substance is applied to a recording medium. An ink having a surface tension higher than the critical surface tension of the recording medium is applied to the portions of the recording medium where the liquid was applied, and the surface tension of the recording medium by an interaction of the liquid and ink.

The present invention enables ink-jet recording in which a performance having a high fixing speed and a performance capable of obtaining a high image density with an excellent clearness of the image are compatible with each other on a recording medium mainly comprising plain paper, which have been problems for many years.

Further objects, features and advantages of the present invention will become apparent from the following description of the preferred embodiments (with reference to the attached drawings).

DESCRIPTION OF THE PREFERRED EMBODIMENTS

Figure 1:
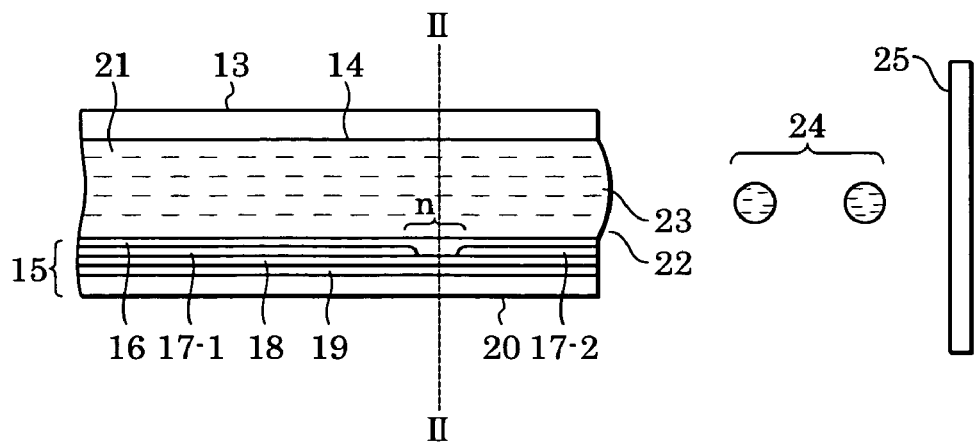
FIG. 1 is a vertical cross-section of the head of the ink-jet printer.

The present invention will be described in more detail hereinafter with reference to preferred embodiments. It is important to control permeation of the ink into recording media (mainly comprising plain paper). For obtaining a sufficient image density and to enable clear recording of images by fixing on a recording medium mainly comprising plain paper at high speed, it is preferable to use an ink having a higher surface tension than the critical surface tension of the recording medium when the ink is applied to a recording medium. However, it is also necessary, when expansion of the ink in lateral directions has stopped and in the process for permitting the ink to permeate in a vertical direction within the recording medium, that the surface tension of the in is rapidly decreased to a surface tension lower than or equal to the critical surface tension of the recording medium in order to accelerate permeation of the ink.

The change of the surface tension of the ink is preferably rapid. The inventors of the present invention have made intensive studies on the technology for rapidly decreasing the surface tension after the ink has been applied to the recording medium in order to cope with this response speed, and have completed the present invention by finding that a remarkable result is obtained in the method taking advantage of expression of surface activity of the surfactant contained in the ink.

The reason why remarkably good results were obtained in the method for taking advantage of the expression of surface activity of a surfactant contained in the ink is considered as follows. While a rapid decrease of the surface tension is observed in the surfactant by slowly adding the surfactant in the ink until the concentration reaches a critical micelle concentration, the surface tension becomes substantially constant when the concentration exceeds the critical micelle concentration. Accordingly, for obtaining a large change of the surface tension of the ink before and after adhesion of the ink on the recording medium, which is preferred in the invention, it is preferred to take advantage of the concentration changes of the surfactant in the ink from below to above the critical micelle concentration. The critical surface tension of the recording medium lies within the range of the surface tension of the ink that decreases by allowing the concentration of the surfactant to exceed the critical micelle concentration in the ink system of the invention. Thus, the above-mentioned problem of the invention can be solved by precisely controlling the composition of the ink so as to exhibit surface activity.

Surface activity as used in the present invention means an effect of decreasing the surface tension in the presence of the surfactant.

The ink according to the present invention takes advantage of expression of the surface activity of an acid form of the surfactant. The surface activity is expressed by solubilizing the surfactant having an initial concentration higher than or equal to the critical micelle concentration to change the concentration above the critical micelle concentration. The preferred effect of the present invention obtained when the critical surface tension of the recording medium lies within the range of the decrease of the surface tension of the ink caused by the concentration change. Specific method for allowing the surface activity of the surfactant to express will be described below. The ink initially comprises an acid form of the anionic surfactant, and the surfactant is solubilized by changing it into a salt form after the ink has been applied to the recording medium. Since the surface tension is largely changed even by a small amount of expression of surface activity, it is advantageous to use a surfactant having a low critical micelle concentration. Particularly, the critical micelle concentration of the surfactant used is preferably lower than or equal to 0.0005 mol/L.

In the method for using the ink designed as described above, the surface activity of the acid form of the anionic surfactant is expressed by increasing the pH to an alkaline region. This method takes advantage of a function of the surfactant by solubilizing the surfactant in the ink as a result of forming a soluble salt by a chemical reaction of anionic groups in the surfactant. This method can be achieved by using paper containing an alkaline substance, or by coating paper with the alkaline substance in advance. It is preferable to apply a larger quantity of the alkaline substance than the number of water-soluble groups in the surfactant when a substance that reacts with the acid group of the anionic surfactant is coated on recording medium in advance.

Although the alkaline substance used in this case is not restricted at all so long as the acid form of the surfactant is solubilized, hydroxides of alkali metals and ammonium, and alkanol amines are preferable.

<Recording Medium>

The recording medium used in the present invention will be described below. Various recording media have been known in ink-jet recording. The so-called ink-jet paper used for output of label printers and digital cameras comprises an ink-receiving layer. The ink-receiving layer has a void structure comprising an inorganic filler, such as silica and alumina, and a water-soluble resin, or is a swellable type comprising a water-soluble resin, such as gelatin. The ink-jet paper having such an ink-receiving layer is reliably wettable with an ink having a substantially high surface tension, for example with an ink prepared by dissolving a water-soluble dye in a solvent comprising 100% water, and its critical surface tension exceeds 70 mN/m in most cases. Since the surface tension of the ink is designed to be higher than the critical surface tension of the recording medium before contacting the recording medium, ink-jet paper having conventional ink-receiving layers is not preferable for use with the scope of the present invention.

Accordingly, the object of the invention is so-called plain paper mainly comprising cellulose and in which a sizing agent is added, or light-weight paper including an ink-receiving layer with a critical surface tension of preferably 26 to 44 mN/m, more preferably 27 to 40 mN/N, and even more preferably 28 to 36 mN/m. This range of the critical surface tension enables the change of the surface tension of the ink accompanying expression of surface activity of the surfactant to be realized by precisely controlling the composition of the ink.

A general method for measuring the critical surface tension of the recording medium was proposed by Zisman. Usually, a contact angle $\theta$ of the recording medium is measured with respect to a series of saturated hydrocarbon liquids having different surface tension $\gamma$, and a plot of (cos θ−γ) of these measured values is extrapolated to cos θ=1 to obtain γ as the critical surface tension of the recording medium. However, since the critical surface tension is high in the recording medium mainly comprising plain paper, the method using the saturated hydrocarbon liquid as described above is inappropriate because it gives a measured value out of the desired range. Accordingly, the point where cos θ=1 is determined using solutions with various mixing ratios of water and ethanol, and the critical surface tension of the recording medium is determined from the surface tension of a mixed solution.

The method for measuring the surface tension of the ink in the process of changing the surface tension when the ink contacts the recording medium, laterally spreads, and starts to permeate in the vertical direction, will be described below. Since actual ink droplets are so tiny, it is difficult to measure the surface tension by retrieving the ink after contact and permeation. It is also difficult to determine an accurate surface tension after contact due to the effect of evaporation of water in the ink. Accordingly, such changes of the surface tension of the ink according to the invention were measured by the following method.

A contact volume between the ink in the recording medium, before the surface activity expression reaction of the anionic surfactant in the ink occurs by allowing ink droplets to collide with the recording medium, and the recording medium is important. In calculating the contact volume, it was assumed that perfectly spherical ink droplets have a perfect circular shape with a blur ratio of 2 on the surface of the recording medium in the finally fixed state of the ink, and the distribution of the ink formed by permeation of the ink is semi-spherically fixed. It was also assumed that the ink starts to be laterally spread followed by vertical permeation after the contact, and the surface tension of the ink decreases to the critical surface tension of the recording medium when ¼ volume of the ink permeates into the recording medium. The specific gravity of paper was assumed to be 0.8 relative to the specific gravity of the ink. On the basis of this assumption, the ink and the recording medium were mixed in a mass percent of 1/0.8, and the surface tension of the ink was measured by promptly retrieving the ink to define the measured value as the surface tension of the ink after contacting the recording medium.

Actually, the change of the surface tension of the ink is thought to be larger as a result of evaporation of water. Accordingly, it is not a problem to discuss the surface tension of the ink based on the measurement as described above.

When a treatment agent containing the alkaline substance is coated on the recording medium in advance, the substance is preferably applied in mole ratios more than or equal to the number of the anionic group in the anionic surfactant present in the ink.

<Ink>

The ink according to the present invention will be described below. The ink according to the present invention comprises at least water, a pigment, a dispersing agent for dispersing the pigment and an acid form of an anionic surfactant. The surface tension of the ink is higher than the critical surface tension of the recording medium before applying the ink, and the surface tension of the ink changes to a surface tension lower than or equal to the critical surface tension of the recording medium after the ink contacts the recording medium. These components will be described below.

(Aqueous Medium)

although the ink according to the invention comprises water as an essential component, the content of water in the ink is preferably larger than or equal to 30 percent by mass and smaller than or equal to 95 percent by mass relative to the total mass of the ink.

An aqueous medium using water, water-soluble solvents and a substance together is often used. Examples of the components combined with water include alkyl alcohols with a carbon number of 1 to 5, such as methyl alcohol, ethyl alcohol, n-propyl alcohol, isopropyl alcohol, n-butyl alcohol, sec-butyl alcohol, tert-butyl alcohol and n-pentyl alcohol; amides such as dimethylformamide and dimethylacetamide; ketones or ketoalcohols such as acetone and diacetone alcohol; ether such as tetrahydrofuran and dioxane; oxyethylene or oxypropylene polymers such as diethyleneglycol, triethyleneglycol, tetraethyleneglycol, dipropyleneglycol, tripropyleneglycol, polyethyleneglycol and polypropyleneglycol; alkyleneglycols in which the alkylene group contains 2 to 6 carbon atoms such as ethyleneglycol, propyleneglycol, trimethyleneglycol, 1,4-butanediol and 1,5-pentanediol; triols such as 1,2,6-hexnetriol, glycerin and trimethylol propane; lower alkylethers of glycols such as ethyleneglycol monomethyl(or ethyl)ether, diethyleneglycolmethyl (or ethyl) ether and triethyleneglycolmonomethyl(or ethyl or butyl)ether; lower dialkylethers of polyfunctional alcohols such as triethyleneglycoldimethyl(or ethyl or butyl)ether and tetraethyleneglycoldimethyl(or ethyl)ether; alkanol amines such as monoethanolamine, diethanolamine and triethanolamine; sulfolane; N-methyl-2-pyrrolidone; 2-pyrrolidone; 1,3-dimethyl-2-imidazolydinone; urea; ethylene urea and bishydroxyethyl sulfone.

Ethyleneglycol, diethyleneglycol, triethyleneglycol, tetraethyleneglycol, polyethyleneglycol (average molecular weight of 200 to 1000), 2-pyrrolidone, glycerin, 1,2,6-hexanetriol, ethylene urea and trimethylol propane are preferably used among them, and glycerin is particularly suitable. While the kind and content of the water-soluble solvent to be used together with water are not particularly restricted, the content is preferably more than or equal to 3 percent by mass and lower than or equal to 60 percent by mass relative to the total mass of the ink.

(Surfactant)

The ink according to the present invention essentially comprises an acid form of an anionic surfactant in order to change the concentration of the surfactant more than or equal to the critical micelle concentration after the ink has been applied to the recording medium. The acid form of the anionic surfactant is usually obtained by acid precipitation. In a first method, the acid form of the anionic surfactant thus obtained is directly added to the ink. In another preferable method, the anionic surfactant is dissolved in a neutral to alkaline ink, the pH of the ink is lowered to an acidic region for initiating precipitation, and the surfactant is allowed to remain in the ink as an acid form.

Examples of the anionic surfactant available in the present invention include fatty acid salts, sulfate ester salts of higher alcohols, alkylbenzene sulfonate salts, phosphate ester salts of higher alcohols and carboxylate salts of cyclic peptides. These compounds may be used alone, or plurality of them may be used.

The surfactant available in the present invention is not particularly restricted. The corresponding anionic surfactant having a cyclic peptide in its molecular structure with a critical micelle concentration of lower than or equal to 0.0005 mol/L is preferable among them.

Specific examples of amino acids contained in the cyclic peptide include glycine, alanine, valine, norvaline leucine, norleucine, isoleucine, phenylalanine, tyrosine, diiodotyrosine, surinamine, threonine, serine, proline, hydroxyproline, tryptophane, thyroxin, methionine, cystine, cysteine, α-aminobutyric acid, aspartic acid, glutamic acid, asparagine, glutamine, lysine, hydroxylysine, arginine and histidine.

While the amino acid contained in the surfactant having the cyclic peptide structure is not particularly restricted so long as the critical micelle concentration of the anionic surfactant is in the range of lower than or equal to 0.0005 mol/L, it may comprise a hydrophilic site comprising a cyclic peptide containing 5 to 10 amino acid residues and a branched structure, and a hydrophobic site having a long chain alkyl and/or long chain alkylphenyl site with a carbon number of the main chain of larger than or equal to 8 is preferable. The carboxylic group and salts thereof are suitable as the water-soluble group.

Although the anionic surfactant having the structure as described above with a critical micelle concentration of lower than or equal to 0.0005 mol/L may be synthesized by a conventional method, the surfactant having the following structure is preferable.

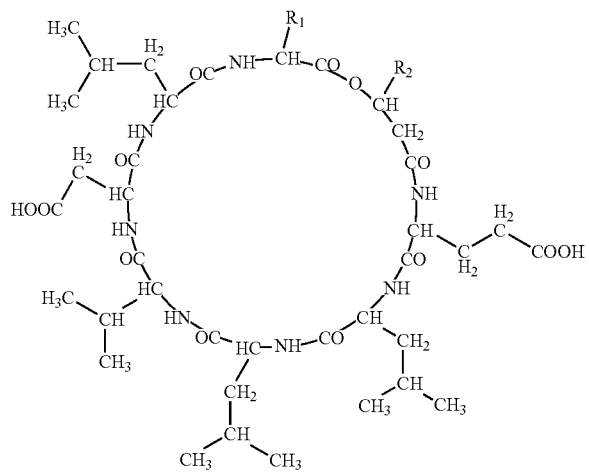

In the formula above, $R_1$ denotes an amino acid residue represented by any one of $CH(CH_3)_2$, $CH_2CH(CH_3)_2$ and $CH(CH_3)CH_2CH_3$, and $R_2$ denotes a long alkyl chain represented by any one of $(CH_2)_6CH(CH_3)_2$, $(CH_2)_9CH(CH_3)_2$ and $(CH_2)_{11}CH_3$.

The commercially available substance having the structure above corresponds to Aminofect (trade name: manufactured by Showa Denko Co., critical micelle concentration 0.000003 mol/L, 7 amino acid residues, 2 carboxylic groups, 12 alkyl chain carbon atoms). For example, a substance having a structure in which $R_1$ is $CH_2CH(CH_2)_2$ and $R_2$ is $(CH_2)_9CH(CH_3)_2$ is contained in Aminofect.

The content of the specified anionic surfactant having the structure as described above and being used in the present invention is preferably 0.00001 to 3 percent by mass, more preferably 0.00005 to 2.5 percent by mass, and even more preferably 0.0001 to 2 percent by mass, in the total quantity of the ink.

A nonionic surfactant is preferably used together with the anionic surfactant as described above in order to obtain a good balance between ejection stability and printing durability. Concomitant use of the nonionic surfactant such as, for example, polyoxyethylene alkylether and ethyleneoxide adduct of acetyleneglycol is preferable. The HLB of this nonionic surfactant is preferably higher than or equal to 10, more preferably higher than or equal to 13, and even more higher than or equal to 15. The content of the nonionic surfactant is preferably 0.01 to 3 percent by mass, more preferably 0.05 to 2.5 percent by mass, and even more preferably 0.1 to 2 percent by mass in the ink when these nonionic surfactants are used together.

While the initial surface tension of the ink according to the present invention should be determined to be higher than the critical surface tension of the recording medium, the difference between the critical surface tension of the recording medium and the surface tension of the initial ink is preferably small from the viewpoint of reaction speed. While the surface tension of the ink is basically adjusted by the surfactant, the water-soluble solvents and other substances as described above, the difference of the surface tension is preferably 0 to 10 mN/m, more preferably 0 to 8 mN/m, and even more preferably 0 to 5 mN/m relative to the critical surface tension of the recording medium.

(Additives)

Additives, such as pH control agents, viscosity controlling agents, defoaming agents, antiseptics, antifungal agents and antioxidants may be added in addition to the components described above to achieve desired physical properties. While the pH may be able to permit the anionic surfactant to remain as the acid form, it is preferably less than 6.5, more preferably less than 6.

(Colorant)

The pigment is preferably used as a colorant contained in the ink according to the invention. The effect of the present invention is not easily obtained when the colorant is a dye. The amount of addition of the pigment in the ink is preferably 0.1 to 15 percent by mass, more preferably 0.2 to 12 percent by mass, and even more preferably 0.3 to 10 percent by mass, although it is not restricted to within this range.

In the example of the pigment available in the present invention, carbon black is suitable as the pigment used in the black ink. Specific examples of the carbon black pigment include furnace black, lamp black, acetylene black and channel black. The preferably used carbon black pigment has a primary particle diameter of 15 to 40 nm, a specific surface area by the BET method of 50 to 300 $m^2/g$, DBP oil absorption of 40 to 150 ml/100 g, and a content of volatile fractions of 0.5 to 10%.

The following organic pigments are favorably used as the pigment in the color ink. Specific examples include insoluble azo pigments such as toluidine red, toluidine marine, Hansa yellow, benzidine yellow and pyrazolon red; soluble azo pigments such as lithol red, hello Bordeaux, pigment scarlet and permanent red 2B; derivatives from vat dyes such as alizarin, indantron and thioindigo maloon; phthalocyanine pigments such as phthalocyanine blue and phthalocyanine green; quinacridone pigments such as quinacridone red and quinacridone magenta; perylene pigments such as perylene red and perylene scarlet; isoindolinone pigments such as isoindolinone yellow and isoindolinone orange; imidazolone pigments such as benzimidazolone yellow, benzimidazolone orange and benzimidazolone red; pyranthrone pigments such as pyranthrone red and pyranthrone orange; thioindigo pigments; condensed azo pigments; diketopyrrolopyrrole pigments; flavanthrone yellow; acylamide yellow; quinophthalone yellow; nickel azo yellow; copper azomethin yellow; perynone orange; anthrone orange; dianthraquinonyl red; and dioxadine violet.

Examples of the organic pigments represented by color indices (C.I.) numbers include C.I. pigment yellow-12, 13, 14, 17, 20, 24, 55, 74, 83, 86, 93, 97, 98. 109, 110, 117, 120, 125, 128, 137, 138, 139, 147, 148, 150, 151, 153, 154, 155, 166, 168, 180 and 195; C.I. pigment orange 16, 36, 43, 51, 55, 59, 61 and 71; C.I. pigment red 9, 48, 49, 52, 53, 57, 97, 122, 123, 149, 168, 175, 176, 177, 180, 192, 202, 209, 215, 216, 217, 220, 223, 224, 226, 227, 228, 238, 240, 254, 255 and 272; C.I. pigment violet 19, 23, 29, 30, 37, 40 and 50; C.I. pigment blue 15, 15:1, 15:3, 15:4, 15:6, 22, 60 and 63; C.I. pigment green 7 and 36; and C.I. pigment brown 23. 25 and 26. While pigments other than those described above may be used, C.I. pigment yellow 13, 17, 55, 74, 93, 97, 98, 110, 128, 139, 147, 150, 151, 154, 155, 180 and 185; C.I. pigment red 122, 202 and 209; and C.I. pigment blue 15:3 and 15:4 are more preferable among them.

(Dispersing Agent)

The dispersing agent for dispersing the pigment will be described below. While it is needless to say that the dispersing agent in the present invention has a function for dispersing the pigment itself in the ink, it also serves for dispersing the acid form of the anionic surfactant that is substantially insoluble in water. However, the hydrophilic function necessary for dispersing in water depends on the hydrophilic groups of the dispersing agent in the dispersion of the acid form of the anionic surfactant, and the hydrophilicity by ionization of the acid form of the anionic surfactant is not expressed. Accordingly, the function as the surfactant, or reduction of the surface tension, is not found from the structural point of view.

While the dispersing agent for dispersing the pigment in the present invention is not particularly restricted so long as it is soluble in water, specific examples thereof include block copolymers, random copolymers graft copolymers or derivatives thereof comprising at least two monomers (at least one of them is a hydrophilic monomer) selected from styrene, styrene derivatives, vinyl naphthalene, vinyl naphthalene derivatives, alcohol esters of ethylenic α,β-unsaturated carboxylic acid, acrylic acid, acrylic acid derivatives, maleic acid, maleic acid derivatives, itaconic acid, itaconic acid derivatives, fumaric acid, fumaric acid derivatives, vinyl acetate, vinyl pyrrolidone, acrylamide, and their derivatives. The block copolymer is the preferable dispersing agent for achieving the invention.

The block copolymer has a structure represented by AB, BAB and ABC. The block copolymer having hydrophobic blocks and hydrophilic blocks with a balanced block size for contributing to dispersion stability is particularly advantageous for achieving the present invention. Since such block copolymer is able to integrate functional groups into the hydrophobic block (a block for binding the pigment), and specific interaction between the dispersing agent and pigment for improving dispersion stability may be further enhanced. Such block copolymer is more preferable due to its rheological compatibility when it is used for the ink-jet recording method taking advantage of heat energy, particularly for the ink-jet recording head compatible with small droplets (with a volume of preferably 0.1 to 20 pl, more preferably 0.1 to 15 pl, and even more preferably 0.1 to 10 pl). The amount of the polymer in the ink depends on the structure, molecular weight and other characteristics of the polymer, and other components of the ink composition. The weight average molecular weight selected for practicing the present invention is preferably less than 30,000, more preferably less than 20,000, and even more preferably in the range of 2,000 to 10,000.

The method for manufacturing these polymers, and the method for dispersing the pigment are disclosed in detail in Japanese Patent Laid-Open Nos. 05-179183, 06-136311, 07-053841, 10-87768, 11-043639, 11-236502 and 11-269418.

While representative hydrophobic monomers available for the block copolymer are as follows, the present invention is not restricted to these monomers. Examples thereof include benzyl acrylate, benzyl methacrylate, methyl methacrylate (MMA), ethyl methacrylate (EMA), propyl methacrylate, n-butyl methacrylate (BMA or NBMA), hexyl methacrylate, 2-ethylhexyl methacrylate (EHMA), octyl methacrylate, lauryl methacrylate (LMA), stearyl methacrylate, phenyl methacrylate, hydroxyethyl methacrylate (HEMA), hydroxypropyl methacrylate, 2-ethoxyethyl methacrylate, methacrylonitrile, 2-trimehtylsiloxyethyl methacrylate, glycidyl methacrylate (GMA), p-tolyl methacrylate, sorbyl methacrylate, methyl acrylate, ethyl acrylate, propyl acrylate, butyl acrylate, hexyl acrylate, 2-ethylhexyl acrylate, octyl acrylate, lauryl acrylate, stearyl acrylate, phenyl acrylate, 2-phenylethyl methacrylate, hydroxyethyl acrylate, hydroxypropyl acrylate, acrylonitrile, 2-trimethylsiloxyethyl acrylate, glycidyl acrylate, p-tolyl acrylate and sorbyl acrylate. Preferable hydrophobic monomers are benzyl acrylate, benzyl methacrylate, 2-phenylethyl methacrylate, methyl methacrylate, butyl methacrylate and 2-ethylhexyl methacrylate. It is preferable to produce homopolymers and copolymers, for example block copolymers, using a copolymer of methyl methacrylate and butyl methacrylate.

While representative hydrophilic monomers available for the block copolymer are as follows, the present invention is not restricted thereto. Examples include methacrylic acid (MMA), acrylic acid, dimethylaminoethyl methacrylate (DMAEMA), diethylaminoethyl methacrylate, t-butylaminoethyl methacrylate, dimethylaminoethyl acrylate, diethylaminoethyl acrylate, dimethylaminopropyl methacrylamide, methacrylamide, acrylamide and dimethyl acrylamide. The block copolymer is preferably produced using a homopolymer or copolymer of methacrylic acid, acrylic acid or dimethylaminoethyl methacrylate.

Polymers containing acids may be directly produced, or provided from blocked monomers having blocking groups that are eliminated after polymerization. Examples of the blocked monomer that generates acrylic acid or methacrylic acid after eliminating the blocking group include trimethylsilyl methacrylate (TMS-MAA), trimethylsilyl acrylate, 1-butoxyethyl methacrylate, 1-ethoxyethyl methacrylate, 1-butoxyethyl acrylate, 1-ethoxyethyl acrylate, 2-tetrahydropyranyl acrylate and 2-tetrahydropyranyl methacrylate.

Allowing the block copolymers as described above to be contained in the ink according to the present invention permits ink ejection stability to be more evidently improved, particularly when the ink-jet recording head using the thermal energy is actuated at a high frequency, for example, at a frequency higher than or equal to 5 kHz.

The content of the dispersing agent as described above in the ink is preferably 0.5 to 10 percent by mass, more preferably 0.8 to 8 percent by mass, and even more preferably 1 to 6 percent by mass. It is difficult to maintain a desired viscosity of the ink when the content of the pigment dispersing agent in the ink is higher than the above range.

While the components constituting the ink of the present invention have been described above, the average particle diameter of the pigment in the pigment dispersion solution as the ink of the present invention is preferably in the range of 50 to 200 nm. The average particle diameter can be measured using ELS-8000 (trade name, manufactured by Otsuka Electronics Co.) or Micro Track UPA 150 (trade name, manufactured by Nikkiso Co.)

<Ink-Jet Recording Method and Recording Apparatus>

The ink-jet recording method and recording apparatus using the ink according to the present invention constructed will be described below. The following construction of the printer is not necessary when processed paper, in which an alkaline substance is added in the paper making process, is used as the recording medium. On the contrary, the following construction of the printer is preferred when the recording medium, such as recording paper, is coated with a liquid (named as a first liquid hereinafter) containing the alkaline substance prior to printing. When the first liquid containing the alkaline substance and the ink according to the present invention are used, the first liquid is applied to the recording paper prior to the ink. Then, the ink according to the present invention is applied to the portions where the first liquid has been applied basically without heating or forced drying to obtain a recorded image. The recording paper may be subjected to forced drying, such as heat-drying, after the first liquid has been applied on recording paper, if necessary.

While the first liquid may be applied on the entire surface of the recording medium using a spray or roller, it is preferable to use an ink-jet method by which the first liquid is selectively and uniformly applied on the portion where the ink is applied thereafter. When the first liquid is applied by the ink-jet method, the first liquid should be previously applied on the portion where the ink is to be applied. While the size of one droplet of the first liquid and ink, or the dot diameter formed on recording paper is not particularly restricted, a desired effect may be obtained when the dot diameter of the first liquid is larger than the dot diameter of the recording ink.

Figure 2:
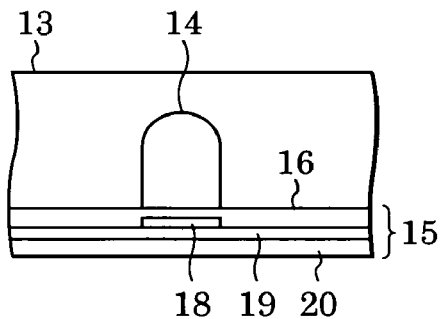
FIG. 2 is a transverse cross-section of the head of the ink-jet printer.
Figure 3:
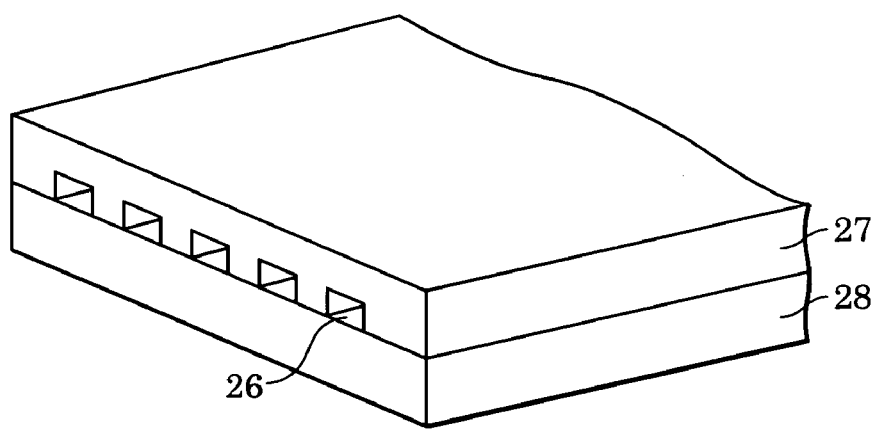
FIG. 3 is a perspective overview of the multiple-nozzle head shown in FIG. 1.

The recording apparatus used in the present invention will be described below. The ink-jet method by which a recording signal is applied to a recording head to eject the droplets by generated heat energy is favorably used in the present invention. The construction of the recording head as a major part of the recording apparatus is shown in FIGS. 1, 2 and 3.

A head 13 is obtained by bonding a thermal head 15 (the head is not restricted to that shown in the drawing) having a resistor used for thermal recording to a glass, ceramic or plastic member in which the ink flow passageways 14 were formed. The thermal head 15 comprises a protective film 16 composed of silicon oxide etc., aluminum electrodes 17-1 and 17-2, a heating resistor layer 18 composed of nichrome etc., an oven layer 19 and a substrate 20 made of a radiator such as alumina etc.

The ink 21 reaches an ejection orifice 22, and forms a meniscus 23 by receiving a pressure. When an electric signal is applied to the electrodes 17-1 and 17-2, the region of the thermal head 15 denoted by "n" is rapidly heated, and bubbles are formed in the ink 21 in contact with the head. The meniscus is formed by the pressure of the bubbles to form recording droplets 24 from the nozzle, and the droplets fly toward the recording medium 25. FIG. 3 illustrates a recording head in which many nozzles shown in FIG. 1 are arranged. The recording head is manufactured by bonding a glass plate 27 having many flow passageways 26 to a thermal head 28 similar to that described in FIG. 1. FIG. 1 is a cross-section of the head 13 along the ink passageway 26 shown in FIG. 3, and FIG. 2 is a cross-section along the line II-II in FIG. 1.

Figure 4:
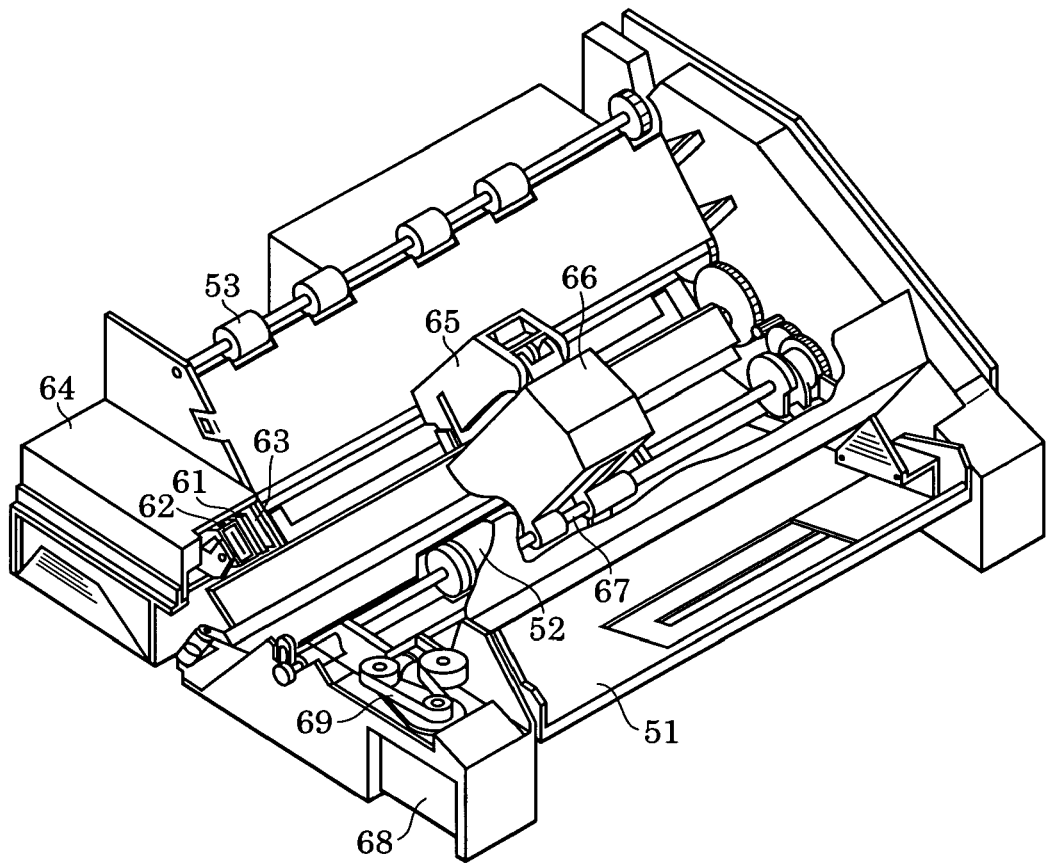
FIG. 4 is a perspective view of an example of the ink-jet recording apparatus.

FIG. 4 shows an example of the ink-jet recording apparatus in which the head is integrated. In FIG. 4, the reference numeral 61 denotes a blade as a wiping member, and one end thereof serves as a fixed end by being held with a blade holding member to form a cantilever. The blade 61 is disposed adjacent to a recording area of the recording head, and contacts an ejection port by moving in a direction perpendicular to the travel direction of the recording head to provide capping. The reference numeral 63 denotes an ink absorbing body provided in adjoining relation to the blade 61, and is held by being protruded in the travel passageway of the recording head as the blade 61 is. An ejection recovery part 64 comprises the blade 61, cap 62 and absorbing body 63, and moisture and dust on the ink ejection port face are removed with the blade 61 and absorbing body 63.

The reference numeral 65 denotes a recording head having an ejection energy generating device for recording by ejecting the ink onto the recording medium opposed to an ejection port face having ejection ports. The reference numeral 66 denotes a carriage for allowing the recording head 65 to travel by mounting the recording head 65 thereto. The carriage 66 is slidably engaged with a guide shaft 67, and a part of the carriage 66 is connected to a belt 69 driven with a motor 68. The carriage 66 is movable along the guide shaft 67, or is movable in the recording region and adjoining regions for the recording head.

The reference numeral 51 denotes a paper feed part for inserting the recording medium, and the reference numeral 52 denotes a paper feed roller driven with a motor (not shown). Such construction permits the recording medium to be fed to a position opposed to the ejection port face of the recording head, and the recording medium is discharged to a discharge part comprising a discharge roller 53 in accordance with recording.

While the cap 62 of the ejection recovery part 64 is shunted from the travel passageway of the recording head 65 when the recording head returns to a home position after recording, the blade 61 remains to be protruded in the travel passageway. Consequently, the ejection port face of the recording head 65 is wiped with the blade. When the cap 62 is capped in contact with the ejection port face, the cap 62 travels so as to protrude in the travel passageway of the recording head.

The cap 62 and blade 61 stay at the same position as the position for wiping when the recording head 65 travels from the home position to the recording start position. Consequently, the ejection port face of the recording head is wiped during the movement.

The recording head moves not only to the home position at the end of recording and during recovery of ejection, but also to a home position adjacent to the recording region with a given interval when the recording head moves to the recording region for recording, and the ejection port face is also wiped during this movement.

Figure 5:
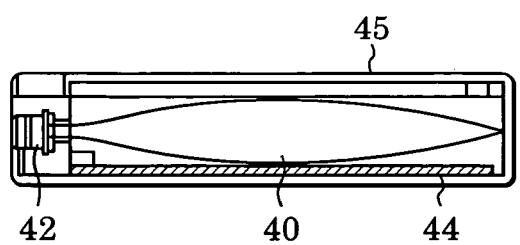
FIG. 5 is a cross-section of the ink cartridge.

FIG. 5 shows an example of an ink feed member, for example, an ink cartridge 45 accommodating the ink fed via a tube. The reference numeral 40 denotes an ink container, for example, an ink bag, which comprises a rubber tap 42 at the tip thereof. The ink in the rubber bag 40 is fed to the head by inserting a needle (not shown) into the tap 42. The reference numeral 44 denotes an ink absorber for receiving the waste ink. The surface of the ink container for making contact with the ink is preferably made of polyolefin, particularly polyethylene. The head and ink cartridge are not always separately formed as described above in the ink-jet recording apparatus used in the present invention, and they may be integrated as shown in FIG. 6.

Figure 6:
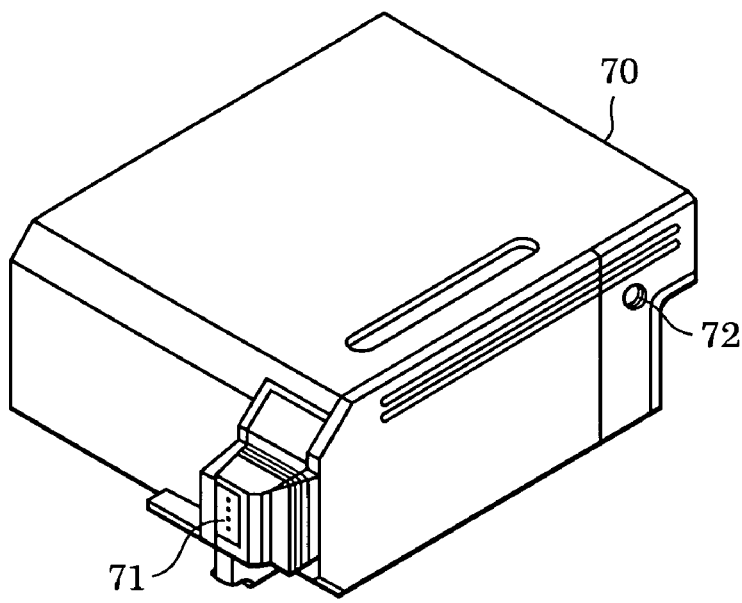
FIG. 6 is a perspective view of the recording unit.

In FIG. 6, the reference numeral 70 denotes a recording unit that accommodates an ink container, for example, an ink absorber, filled with the ink. The ink in the ink absorber is ejected as ink droplets from a head portion 71 having a plurality of nozzles. Polyurethane may be used, for example, as the material of the ink absorber. The reference numeral 72 denotes an air communication hole for communicating the inside of the recording unit with the atmosphere. This recording unit 70 is used in place of the recording head shown in FIG. 4, and is freely attachable to and detachable from the carriage 66. While the ink-jet recording apparatus for ejecting ink droplets by giving heat energy to the ink was shown in the present invention, the present invention is available in other ink-jet recording apparatus, such as a piezoelectric system taking advantage of piezoelectricity.

Figure 7:
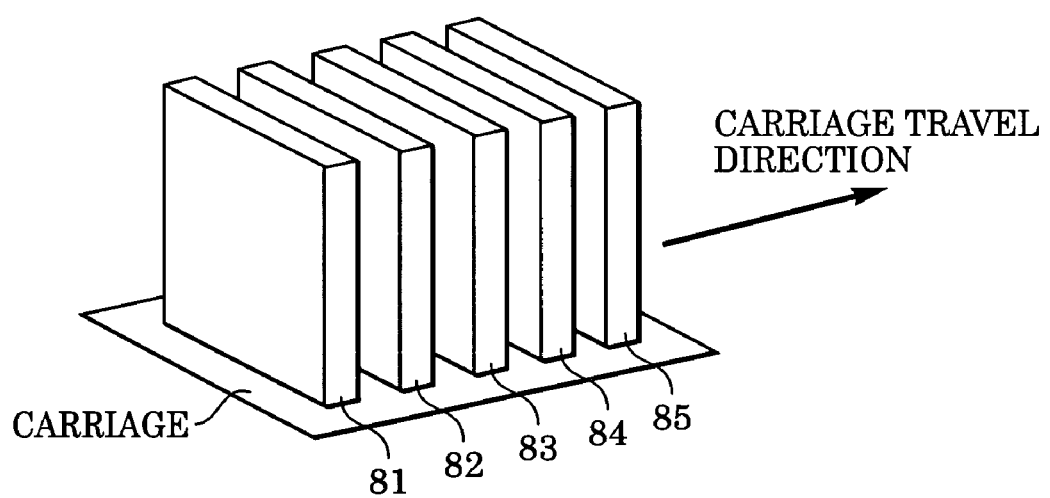
FIG. 7 is a perspective view of a recording part having a plurality of arranged recording heads.
Figure 8:
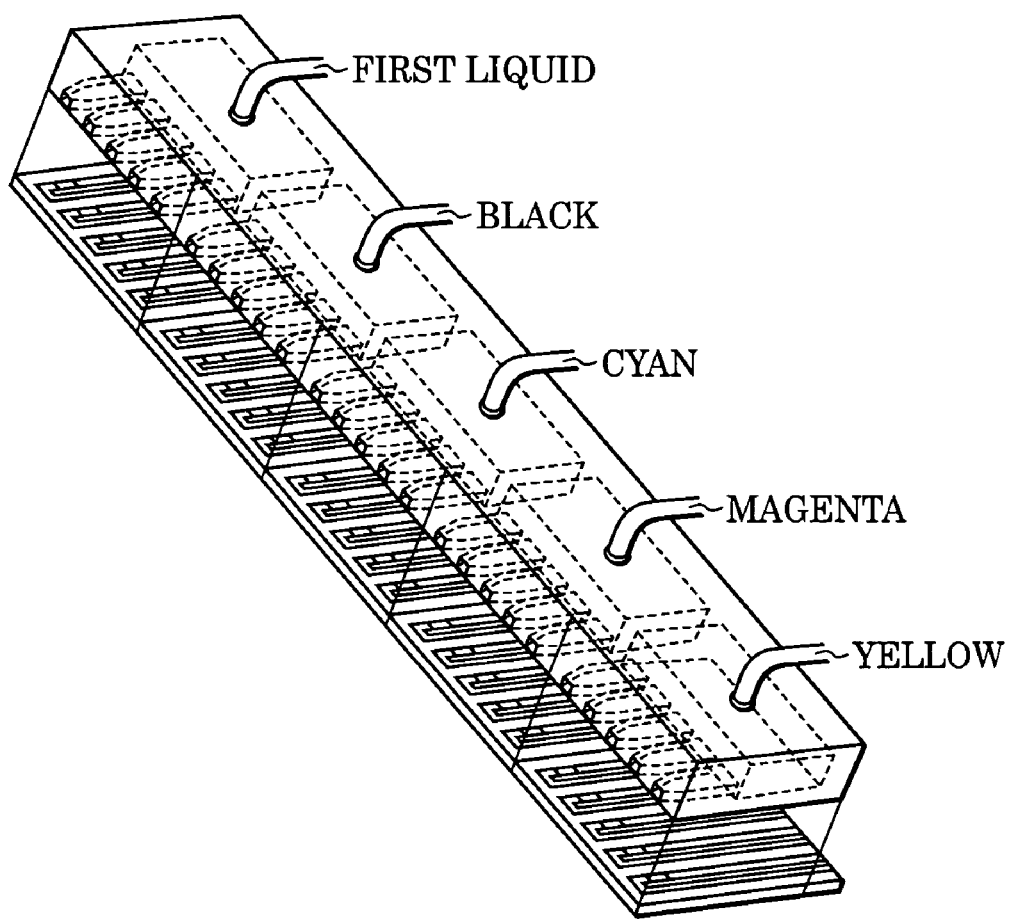
FIG. 8 is a perspective view of another recording head used in the present invention.

A recording apparatus having five heads, as shown in FIG. 3, arranged on the carriage is used for color recording in the present invention. FIG. 7 shows an example thereof. The reference numerals 81, 82, 83 and 84 denote recording heads for ejecting yellow, magenta, cyan and black color inks, respectively. The reference numeral 85 denotes a head for ejecting the first liquid. Each head is disposed on the recording apparatus, and ejects a recording ink of each color depending on the recording signal. The first liquid is applied in advance on the portion where at least the recording ink of each color is applied on recording paper. While five recording heads were used in the example in FIG. 7, the number of the recording heads is not restricted thereto. Instead, it is also preferable to use one recording head by dividing the yellow, magenta, cyan and black inks and first liquid into respective flow passageways as shown in FIG. 8.

Figure 9:
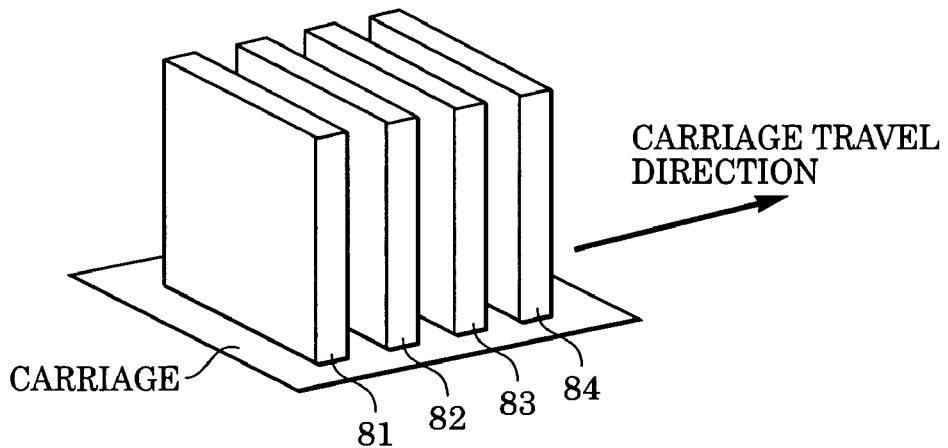
FIG. 9 is a perspective view of another recording part having a plurality of arranged recording heads.
Figure 10:
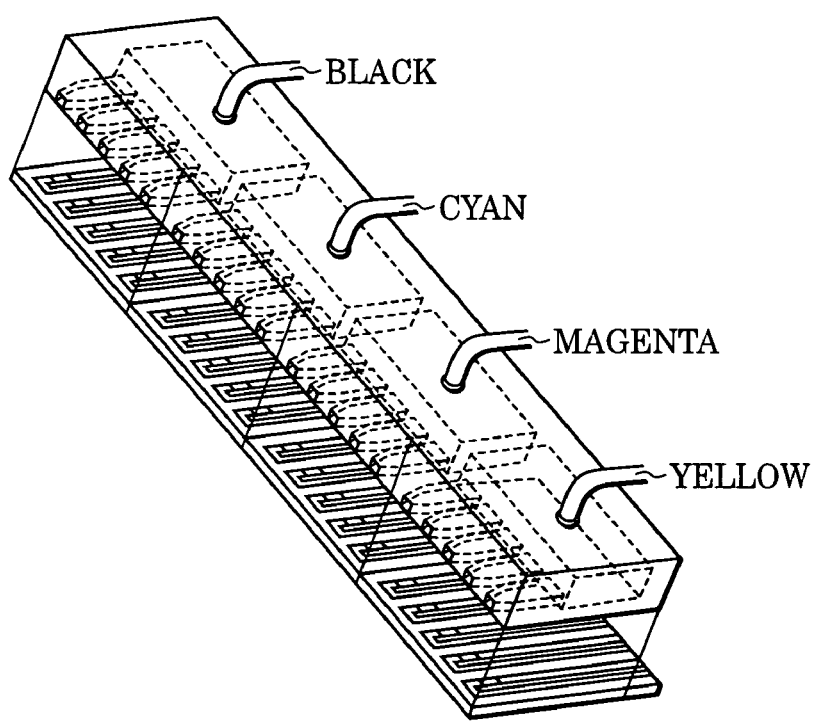
FIG. 10 is a perspective view of another recording head used in the present invention.

A recording apparatus having four recording heads arranged on the carriage is used when the first liquid is not used. FIG. 9 shows an example thereof. The reference numerals 81, 82, 83 and 84 denote the recording heads for ejecting yellow, magenta, cyan and black recording inks, respectively. The heads are disposed on the recording apparatus described above, and eject the recording inks of respective colors depending on the recording signal. While four recording heads are used in the example in FIG. 9, the recording apparatus is not restricted thereto, and it is also preferable to divide magenta, cyan and black inks into respective flow passageways using one recording head as shown in FIG. 10.

EXAMPLES

The present invention will be described in detail with reference to examples and comparative examples. "Parts" and "%" in the descriptions are based on mass unless otherwise mentioned. Inks 1 to 8 were prepared as follows.

<Ink 1>

(Preparation of Pigment Dispersion Solution 1)

A block polymer of AB type with an acid value of 250 and weight average molecular weight of 3,000 was prepared by a conventional method using benzyl methacrylate and methacrylic acid as starting materials. The product was neutralized with an aqueous potassium hydroxide solution to prepare a uniform aqueous polymer solution with a concentration of 50% by diluting with ion-exchange water. The aqueous polymer solution (180 g) obtained and C.I. pigment blue 15:3 (100 g) were mixed with 220 g of ion-exchange water, and the solution was mechanically stirred for 0.5 hours. Then, the mixture was treated by passing through an interaction chamber five times under a hydraulic pressure of about 10,000 psi (about 70 MPa) using a microfluidizer. Cyan color pigment dispersion solution 1 was prepared by removing non-dispersed substances including coarse particles by centrifuging (12,000 rpm, 20 minutes) the dispersion solution obtained above. The pigment dispersion solution 1 had a pigment concentration of 10% and dispersing agent concentration of 10%.

(Preparation of Ink 1)

Cyan color pigment dispersion solution 1 obtained above was used for preparing ink 1. The following components were added to the dispersion solution in prescribed concentrations (adjusted to 100 parts in total by adding ion-exchange water), the pH of the solution was adjusted to 5.9 after thoroughly mixing these components, and the solution was filtered by pressurizing using a micro-filter (manufactured by Fuji Film Co.) with a pore size of 2.5 μm to prepare ink 1 with a pigment concentration of 2% and dispersing agent concentration of 2%. Aminofect (trade name, manufactured by Showa Denko Co., critical micelle concentration=0.000003 mol/L), as an anionic surfactant having a cyclic peptide structure, was added to ink 1 as shown below. Polyoxyethylene cetylether and ethyleneoxide adduct of acetyleneglycol as a nonionic surfactant, were also added.

| | |
|---|---|
| pigment dispersion solution 1 | 20 parts |
| glycerin | 7 parts |
| trimethylol propane | 4 parts |
| ethylene urea | 4 parts |
| polyoxyethylene cetylether (number of ethylene oxide adducts = 30, HLB = 19.5) | 1 part |
| anionic surfactantt having cyclic peptide structure (trade name: Aminofest, manufactured by Showa Denko Co) | 0.05 parts |
| ethyleneoxide adduct of acetyleneglycol (trade name: Acetylenol RH, manufactured by Kawaken Fine Chemicals Co.) | 0.1 parts |
| ion-exchange water | the balance |

<Ink 2>

Ink 2 was prepared by the same method as in ink 1, except that the content of the anionic surfactant having the cyclic peptide structure in the composition of ink 1 was changed to 0.01 parts, and the pH was adjusted to 6.0 with hydrochloric acid.

<Ink 3>

Ink 3 was prepared by the same method as in ink 1, except that the content of the anionic surfactant having the cyclic peptide structure in the composition of ink 1 was changed to 0.001 part, and the pH was adjusted to 5.5 with hydrochloric acid.

<Ink 4>

Ink 4 was prepared by the same method as ink 1, except that the content of the anionic surfactant having the cyclic peptide structure in the composition of ink 1 was changed to 0.00001 parts, and the pH was adjusted to 5.4 with hydrochloric acid.

<Ink 5>

(Preparation of Pigment Dispersion Solution 2)

The same polymer solution (100 g) used in the preparation of pigment dispersion solution 1 , C.I. pigment red 122 (100 g) and ion-exchange water (300 g) were mixed and mechanically stirred for 0.5 hours. Then, the mixture was treated by passing through an interaction chamber five times under a hydraulic pressure of about 10,000 psi (about 70 MPa) using a microfluidizer. Magenta color pigment dispersion solution 2 was obtained by removing non-dispersed substances including coarse particles by centrifuging (12,000 rpm, 20 minutes) the dispersion solution obtained. The pigment dispersion solution 2 had a pigment concentration of 10% and dispersing agent concentration of 5%.

(Preparation of Ink 5)

Magenta color pigment dispersion solution 2 obtained above was used for preparing ink 5. The following components were added to the dispersion solution in prescribed concentrations (adjusted to 100 parts in total by adding ion-exchange water). The mixture was adjusted to pH 6.1 by adding hydrochloric acid after thoroughly mixing these components, and the solution was filtered by pressurizing using a micro-filter (manufactured by Fuji Film Co.) with a pore size of 2.5 μm to prepare ink 5 with a pigment concentration of 4% and dispersing agent concentration of 2%. Aminofect (trade name, manufactured by Showa Denko Co., critical micelle concentration=0.000003 mol/L), as an anionic surfactant having a cyclic peptide structure, was added to ink 5 as shown below. Polyoxyethylene cetylether and ethyleneoxide adduct of acetyleneglycol, as a nonionic surfactant, were also added.

| | |
|---|---|
| pigment dispersion solution 2 | 40 parts |
| glycerin | 7 parts |
| ethylene urea | 2 parts |
| 1,2,6-hexanetriol | 5 parts |
| polyoxyethylene cetylether (number of ethyleneoxide adduct = 30, HLB = 19.5) | 0.3 parts |
| anionic surfactant having cyclic peptide structure (trade name: Aminofest, manufactured by Showa Denko Co.) | 0.05 parts |
| ethyleneoxide adduct of acetyleneglycol (trade name: Acetylenol EH, manufactured by Kawaken Fine Chemicals Co.) | 0.1 part |
| ion-exchange water | the balance |

<Ink 6>

(Preparation of Dispersion Solution 3)

A block polymer of AB type with an acid value of 300 and weight average molecular weight of 4,000 was prepared by a conventional method using benzyl acrylate and methacrylic acid as starting materials. The product was neutralized with an aqueous potassium hydroxide solution to prepare a uniform aqueous polymer solution with a concentration of 50% by diluting with ion-exchange water. The aqueous polymer solution (110 g) obtained and C.I. pigment yellow 128 (100 g) were mixed with 290 g of ion-exchange water, and the solution was mechanically stirred for 0.5 hours. Then, the mixture was treated by passing through an interaction chamber five times under a hydraulic pressure of about 10,000 psi (about 70 MPa) using a microfluidizer. Yellow color pigment dispersion solution 3 was prepared by removing non-dispersed substances including coarse particles by centrifuging (12,000 rpm, 20 minutes) the dispersion solution obtained above. The pigment dispersion solution 3 had a pigment concentration of 10% and dispersing agent concentration of 6%.

(Preparation of Ink 6)

Yellow color pigment dispersion solution 3 obtained above was used for preparing ink 6. The following components were added to the dispersion solution in prescribed concentrations (adjusted to 100 parts in total by adding ion-exchange water). The mixture was adjusted to pH 5.9 by adding hydrochloric acid after thoroughly mixing these components, and the solution was filtered by pressurizing using a micro-filter (manufactured by Fuji Film Co.) with a pore size of 2.5 μm to prepare ink 6 with a pigment concentration of 5% and dispersing agent concentration of 3%. Monosodium lauroyl glutamate (critical micelle concentration=0.0003 mol/L), as an anionic surfactant, was added to ink 6 as shown below. Polyoxyethylene cetylether and ethyleneoxide of acetyleneglycol, as a nonionic surfactant, were also added.

| | |
|---|---|
| pigment dispersion solution 3 | 50 parts |
| glycerin | 7 parts |
| diethyleneglycol | 4 parts |
| ethyleneglycol | 5 parts |
| polyoxyethylene cetylether (number of ethyleneoxide adduct = 30, HLB = 19.5) | 0.3 parts |
| monosodium lauroylglutamate | 0.05 parts |
| ethyleneoxide adduct of acetyleneglycol (trade name: Acetylenol EH, manufactured by Kawaken Fine Chemicals Co.) | 0.1 part |
| ion-exchange water | the balance |

<Ink 7>

(Preparation of Pigment Dispersion Solution 4)

A block polymer of ABC type with an acid value of 350 and weight average molecular weight of 5,000 was prepared by a conventional method using benzyl methacrylate, methacrylic acid and 2-ethoxyethyl methacrylate as starting materials. The product was neutralized with an aqueous potassium hydroxide solution to prepare a uniform aqueous polymer solution with a concentration of 50% by diluting with ion-exchange water. The aqueous polymer solution (60 g) and carbon black (100 g) were mixed with 340 g of ion-exchange water, and the solution was mechanically stirred for 0.5 hours. Then, the mixture was treated by passing through an interaction chamber five times under a hydraulic pressure of about 10,000 psi (about 70 MPa) using a microfluidizer. Black color pigment dispersion solution 4 was prepared by removing non-dispersed substances including coarse particles by centrifuging (12,000 rpm, 20 minutes) the dispersion solution obtained above. The pigment dispersion solution 4 had a pigment concentration of 10% and dispersing agent concentration of 3.5%.

(Preparation of Ink 7)

Black color pigment dispersion solution 4 obtained above was used for preparing ink 7. The following components were added to the dispersion solution in prescribed concentrations (adjusted to 100 parts in total by adding ion-exchange water). The mixture was adjusted to pH 5.9 by adding hydrochloric acid after thoroughly mixing these components, and the solution was filtered by pressurizing using a micro-filter (manufactured by Fuji Film Co.) with a pore size of 2.5 μm to prepare ink 7 with a pigment concentration of 3% and dispersing agent concentration of 1.05%. Aminofect (trade name, manufactured by Showa Denko Co., critical micelle concentration=0.000003 mol/L), as an anionic surfactant, was added to ink 7 as shown below. An ethyleneoxide adduct of acetyleneglycol, as a nonionic surfactant, was also added.

| | |
|---|---|
| pigment dispersion solution 4 | 30 parts |
| glycerin | 7 parts |
| ethylene urea | 5 parts |
| ethyleneglycol | 5 parts |
| anionic surfactant with cyclic peptide structure (trade name: Aminofest, manufactured by Showa Denko Co.) | 0.05 parts |
| ethyleneoxide adduct of acetyleneglycol (trade name: Acetylenol EH, manufactured by Kawaken Fine Chemicals co.) | 0.1 parts |
| ion-exchange water | the balance |

<Ink 8>

Ink 8 was prepared by the same method as ink 7, except that the content of the anionic surfactant having the cyclic peptide structure in the composition of ink 7 was changed to 0.005 parts and the pH was adjusted to 5.8 with hydrochloric acid.

The surface tension of and pH of inks 1 to 8 are shown in Table 1 below.

TABLE 1

Surface Tension and pH of Inks 1 to 8

| | Surface Tension (mN/m) | pH |
|---|---|---|
| Ink 1 | 42 | 5.9 |
| Ink 2 | 42 | 6.0 |
| Ink 3 | 42 | 5.5 |
| Ink 4 | 42 | 5.4 |
| Ink 5 | 41 | 6.1 |
| Ink 6 | 41 | 5.9 |
| Ink 7 | 42 | 5.9 |
| Ink 8 | 42 | 5.8 |

<Preparation of First Liquid I for Reaction>

The following components were added in prescribed concentrations (adjusted to 100 parts in total by adding ion-exchange water) and, after thoroughly mixing these components, the solution was filtered by pressurizing a micro-filter (manufactured by Fuji Film Co.) with a pore size of 0.45 μm to prepare first liquid I.

| | |
|---|---|
| sodium hydroxide (alkaline substance) | 0.5 parts |
| diethyleneglycol | 15 parts |
| isopropyl alcohol | 2.5 parts |
| ethylene urea | 5 parts |
| ethyleneoxide adduct of acetyleneglycol (trade name: Acetylenol EH, manufactured by Kawaken Fine Chemicals Co.) | 1 part |
| ion-exchange water | the balance |

<First Liquid II for Reaction>

First liquid II was prepared by the same method as in first liquid I, except that 0.5 parts of sodium hydroxide in first liquid I was changed to 1 part of triethanolamine (alkaline substance).

<Standard Ink for Evaluating Recording Density and Fixing Speed>

The standard ink was prepared by the same method as inks 1 to 8, except that the content of the anionic surfactant in the compositions of inks 1 to 8 was changed to 0 parts (adjusted to 100 parts in total by adding ion-exchange water). No changes of the surface tension were observed in any of the standard inks before and after contacting the recording medium.

Examples 1 to 10 and Comparative Examples 1 to 10

Images were recorded on commercially available copy paper and bond paper having the characteristics shown in Table 2 using inks 1 to 8 obtained above. The critical surface tension of each recording medium is shown in Table 2.

Table 2: Characteristics of Each Paper Used for Forming

| | Images | |
|---|---|---|
| | | Critical Surface Tension (mN/m) |
| Paper A | Copy Paper | 34 |
| Paper B | Copy Paper | 37 |
| Paper C | Bond Paper | 40 |

Color images were formed using the ink-jet recording apparatus shown in FIG. 4 with five recording heads shown in FIG. 7. When the first liquid is used for the reaction, solid images were recorded with the first liquid using the recording head 85 shown in FIG. 7, and color images were recorded on the same paper. The recording head used was the same as the recording head used in ink-jet printer BJC 820 (trade name, manufactured by Canon Kabushiki Kaisha). The operating condition of each recording head, or the electric current condition, was 28 V input voltage, 3.2 μsec pulse width, and 5 kHz driving frequency.

Images were formed in various combinations of inks 1 to 8. Papers A to C, and first and second liquids I and II for the reaction, as shown in Table 3, and the images were evaluated by the following evaluation methods and evaluation criteria.

(Recording Density)

Inks 1 to 8 as evaluation objects, standard inks for evaluating the recording density, and first and second liquids I and II for the reaction were used. After printing solid images using the compositions of ink, paper and liquid shown in Table 3, the recording density was measured with Macbeth RD 915 (trade name, manufactured by Macbeth Co.) after allowing the images to sit for 1 hour. A ratio of (recording density of evaluation ink)/(recording density of standard ink) was determined, and the measured value was evaluated relative to the image density of the standard ink. The results were evaluated by the following criteria, and the results are shown in Table 3.

A: recording density ratio was larger than or equal to 0.96.

B: recording density ratio was larger than or equal to 0.94 and less than 0.96.

C: recording density ratio was less than 0.94.

(Fixing Speed)

Inks 1 to 8 for evaluatiing objects, standard inks prepared for evaluating of the recording density, and first and second liquids I and II for the reaction were used. Solid images were recorded using the compositions of ink, paper and liquid shown in Table 3, and the fixing time of the image is was measured. The ratio of (fixing time of evaluation ink)/(fixing time of standard ink) was determined, and the results, shown in Table 3, were evaluated by the following criteria.

TABLE 3

Evaluation Results

| | Ink No.: [Surface Tension (mN/m)] | Paper No.: [Critical Surface Tension (mN/m)] | Liquid | Surface Tension of Ink after Contact (mN/m) | Evaluation Results Recording Density | Fixability |
|---|---|---|---|---|---|---|
| Example 1 | 1:[42] | A:[34] | I | 32 | A | A |
| Example 2 | 1:[42] | B:[37] | I | 32 | A | A |
| Example 3 | 1:[42] | C:[40] | I | 32 | A | A |
| Example 4 | 1:[42] | A:[34] | II | 33 | A | B |
| Example 5 | 2:[42] | C:[40] | I | 34 | A | A |
| Example 6 | 3:[42] | C:[40] | II | 36 | B | A |
| Example 7 | 5:[41] | C:[40] | I | 32 | A | A |
| Example 8 | 6:[41] | B:[37] | II | 35 | A | A |
| Example 9 | 7:[42] | B:[37] | I | 32 | A | A |
| Example 10 | 8:[42] | C:[40] | I | 36 | A | A |
| Comparative example 1 | 1:[42] | A:[34] | none | 42 | A | C |
| Comparative example 2 | 1:[42] | B:[37] | none | 42 | A | C |
| Comparative example 3 | 1:[42] | C:[40] | none | 42 | A | C |
| Comparative example 4 | 4:[42] | A:[34] | I | 42 | A | C |
| Comparative example 5 | 4:[42] | B:[37] | I | 42 | A | C |
| Comparative example 6 | 4:[42] | C:[40] | I | 42 | A | C |
| Comparative example 7 | 3:[42] | A:[34] | II | 36 | A | C |
| Comparative example 8 | 6:[41] | A:[34] | II | 35 | A | C |
| Comparative example 9 | 8:[42] | A:[34] | I | 36 | A | C |
| Comparative example 10 | 8:[42] | A:[34] | II | 37 | A | C |

A: fixing speed ratio was less than 0.81.
B: fixing speed ratio was higher than or equal to 0.81 and less than 0.96.
C: fixing speed ratio was higher than or equal to 0.96.

Since the surface tension of the ink changes from a higher side to a lower side of the critical surface tension of the recording medium before and after the contact of the ink with the recording medium, the image obtained has a sufficient image density with a sharp and clear edge of the image. In addition, since the surface tension of the ink decreases and permeability of the ink rapidly increases when the amount of ink on the recording medium is decreased, the fixing speed is remarkably improved. Since the change of permeability at this stage does not adversely affect the density and clearness of the recorded image, compatibility between high speed fixing, and high density recording with a high degree of clearness, can be attained.

While the present invention has been described with reference to what are presently considered to be the preferred embodiments, it is to be understood that the present invention is not limited to the disclosed embodiments. On the contrary, the present invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2003-415800 filed Dec. 12, 2003, which is incorporated herein by reference.

What is claimed is:

1. An ink-jet recording method for forming an image by applying ink to a recording medium,
   the ink comprising at least water, a pigment, a dispersing agent for dispersing the pigment and an acid form of an anionic surfactant, and having a surface tension higher than the critical surface tension of the recording medium, the method comprising the steps of:
   applying the ink on to the recording medium; and
   reducing the surface tension of the ink to a surface tension lower than or equal to the critical surface tension of the recording medium after contacting the recording medium.

2. The ink-jet recording method according to claim 1, wherein the recording medium is plain paper.

3. The ink-jet recording method according to claim 1, wherein the anionic surfactant has a critical micelle concentration of lower than or equal to 0.0005 mol/L.

4. The ink-jet recording method according to claim 1, wherein the critical surface tension of the recording medium is 26 to 44 mN/m.

5. The ink-jet recording method according to claim 1, wherein the difference between the surface tension of the ink and the critical surface tension of the recording medium is 0 to 10 mN/m.

6. The ink-jet recording method according to claim 1, wherein the reduction of the surface tension of the ink after contacting the recording medium is due to expression of surface activity of the acid form of the surfactant caused by a pH change of the ink.

7. The ink-jet recording method according to claim 6, wherein the pH change is an increase of the pH to the alkaline region.

8. The ink-jet recording method according to claim 6, wherein the pH change is caused by using a recording medium containing an alkaline substance.

9. The ink-jet recording method according to claim 1, further comprising the step of:
   coating the recording medium with an alkaline substance prior to applying the ink on the recording medium.

10. The ink-jet recording method according to claim 9, wherein the coating step is performed using an ink-jet method to apply a liquid containing an alkaline substance selectively and uniformly on the portion where the ink is applied thereafter.

11. The ink-jet recording method according to claim 9, further comprising the step of:
    drying the recording medium after the coating step, but prior to applying the ink.

* * * * *

UNITED STATES PATENT AND TRADEMARK OFFICE
CERTIFICATE OF CORRECTION

PATENT NO.       : 7,314,276 B2
APPLICATION NO.  : 11/008918
DATED            : January 1, 2008
INVENTOR(S)      : Koike et al.

It is certified that error appears in the above-identified patent and that said Letters Patent is hereby corrected as shown below:

COLUMN 6:
Line 2, "although" should read --Although--.
Line 22, "1,2,6-hexnetriol," should read --1,2,6-hexanetriol,--.

COLUMN 7:
Line 55, "substancehav-" should read --substance hav- --.

COLUMN 8:
Line 54, "hello" should read --helio--.
Line 56, "maloon;" should read --maroon;--.

COLUMN 9:
Line 5, "98." should read --98,--.
Line 13, "23." should read --23,--.
Line 38, "random copolymers" should read --random copolymers,--.

COLUMN 10:
Line 19, "2-trimehtylsiloxyethyl" should read --2-trimethylsiloxyethyl--.

COLUMN 14:
Line 34, "surfactantt" should read --surfactant--.

COLUMN 15:
Line 5, "(12," should read --(12,000--.
Line 6, "000" should be deleted.

COLUMN 17:
Line 21, "tension of" should read --tension--.

UNITED STATES PATENT AND TRADEMARK OFFICE
CERTIFICATE OF CORRECTION

PATENT NO. : 7,314,276 B2
APPLICATION NO. : 11/008918
DATED : January 1, 2008
INVENTOR(S) : Koike et al.

It is certified that error appears in the above-identified patent and that said Letters Patent is hereby corrected as shown below:

COLUMN 18:
Line 64, "is" should be deleted.

COLUMN 20:
Line 16, "on to" should read --onto--.

Signed and Sealed this

Third Day of March, 2009

JOHN DOLL
*Acting Director of the United States Patent and Trademark Office*